United States Patent
Canard

(10) Patent No.: US 6,237,378 B1
(45) Date of Patent: May 29, 2001

(54) ANTI-THEFT DEVICE INCLUDING AN ELECTRIC SWITCH FOR DETECTION OF KEY INSERTION

(75) Inventor: Louis Canard, Nevers (FR)

(73) Assignee: Valeo Securite Habitacle (FR)

( * ) Notice: Subject to any disclaimer, the term of this patent is extended or adjusted under 35 U.S.C. 154(b) by 0 days.

(21) Appl. No.: 09/483,829

(22) Filed: Jan. 17, 2000

(30) Foreign Application Priority Data

Jan. 15, 1999 (FR) .................................................. 99 00403

(51) Int. Cl.[7] .................................................. B60R 25/02
(52) U.S. Cl. .................. 70/252; 70/186; 70/365; 70/441; 70/491; 70/DIG. 30
(58) Field of Search ............... 70/388, 184–186, 70/252, 441, 491, 365, 366, DIG. 30, DIG. 49

(56) References Cited

U.S. PATENT DOCUMENTS

| | | | |
|---|---|---|---|
| 774,823 | * 11/1904 | Birkedal | 70/387 |
| 3,404,548 | * 10/1968 | Keefer | 70/366 |
| 3,410,123 | * 11/1968 | Jacobi | 70/366 |
| 3,520,161 | * 7/1970 | Jacobi | 70/372 |
| 3,650,131 | * 3/1972 | Eichenauer | 70/252 |
| 3,661,000 | * 5/1972 | Kerr | 70/388 |
| 3,748,881 | * 7/1973 | Erickson | 70/388 |
| 3,826,116 | * 7/1974 | Messera et al. | 70/388 |
| 3,902,341 | * 9/1975 | Peitsmeier | 70/252 |
| 4,328,692 | * 5/1982 | Dice et al. | 70/421 |
| 4,414,830 | * 11/1983 | Maiocco | 70/252 |
| 5,457,973 | * 10/1995 | Grimmer et al. | 70/441 X |

FOREIGN PATENT DOCUMENTS

| 380979 | * 9/1923 | (DE) | 70/365 |
|---|---|---|---|
| 1133221 | * 11/1968 | (GB) | 70/441 |

\* cited by examiner

Primary Examiner—Lloyd A. Gall
(74) Attorney, Agent, or Firm—MOrgan & FInnegan, LLP

(57) ABSTRACT

The disclosure relates to an anti-theft device notably for a motor vehicle. The anti-theft device includes an electrical switch for the detection of key insertion into the anti-theft device. A pusher also included in the anti-theft device slides in both the proximal and distal directions parallel to a key insertion axis. The pusher activates the switch by using an elastic force that tends to move the pusher back against a stop, which holds the pusher in a retracted rest position when the key is withdrawn.

12 Claims, 3 Drawing Sheets

ANTI-THEFT DEVICE INCLUDING AN ELECTRIC SWITCH FOR DETECTION OF KEY INSERTION

BACKGROUND OF THE INVENTION

The present invention concerns an anti-theft device, applicable notably to motor vehicles.

More precisely, the invention concerns an anti-theft device of the type including an electric switch for the detection of the insertion of a key in the anti-theft device.

Such a switch is notably used in association with an electric circuit assuring various functions according to the manipulations of the anti-theft device by the driver of the vehicle. In particular, the insertion of the key in the anti-theft device is detected prior to other operations by the driver, for example starting the engine preheating, as quickly as possible, in the case of a diesel engine.

DESCRIPTION OF THE PRIOR ART

According to a known design, the switch is of the type including a fixed contact and a mobile contact that can move relative to the fixed contact, between an open position in which the switch is held by elastic means, which is therefore the rest position, and a closed position of the switch obtained via a sliding pusher that is pressed by the key, acting against elastic means which return the pusher to its rest position in the absence of a key.

When the key is removed from the anti-theft device, the switch pusher on which the key acts directly or indirectly is returned elastically to a rest position because it must stop acting on the mobile contact to allow the re-opening of the switch.

SUMMARY OF THE INVENTION

The present invention proposes a new design of anti-theft device in which the pusher is particularly simple and compact and which can notably be incorporated in the control rotor of the lock of the anti-theft device, while avoiding accidental jamming of the pusher in either of its two extreme positions.

The invention is therefore an anti-theft device, notably for a motor vehicle, of the type including an electric switch for the detection of insertion (conventionally from the rear towards the front) of a key in the anti-theft device through the action of a pusher that can slide in both directions parallel to the axis of insertion of said key and that activates said switch under the action of said key acting against an elastic force tending to move said pusher back against a stop in a retracted rest position when said key is withdrawn, wherein said pusher is free to slide longitudinally in a housing of a body including means of sliding guidance of the front end of said pusher, and wherein the rear end of said pusher, on which said key acts when it is inserted, cooperates with means on said body forming a ramp to cause a movement of this rear end, in an inclined direction relative to the sliding direction, between a low retracted position corresponding to the rest position of said pusher, and a high advanced activating position.

According to other characteristics of the invention:

The front end of the pusher takes the form of a transversal switch activating bar whose ends are guided in grooves formed in said body and running parallel to the sliding direction of said pusher;

The front transversal bar of said pusher is cylindrical;

The pusher includes a body in the form of a plate, substantially parallel to the direction of insertion of said key, including a longitudinal aperture through which extends vertically a stud of said body whose rear transversal face cooperates with a rear transversal edge of said aperture to constitute a ramp that causes movement of said rear end of said pusher from said low retracted rest position into said high advanced activating position;

The transversal rear face of said stud is inclined upwards from rear to front to constitute an ascending ramp for said pusher towards said high advanced activating position, and wherein the transversal rear edge of said aperture of said pusher is rounded to cooperate with said ascending ramp;

The transversal rear edge of the body of said pusher cooperates with said ascending ramp of the body to cause movement of said rear end of said pusher from said high advanced activating position into said low retracted rest position;

The transversal rear edge of said body of said pusher is rounded to cooperate with a transversal face of said body which is inclined downwards from front to rear to constitute a descending ramp, parallel to said ascending ramp, guiding said pusher towards said low retracted rest position;

The retracted rest position of said pusher is determined by the arrival of its rear end against a stop formed by part of a transversal face of said body;

The body is a rotor body mounted rotationally on an axis parallel to the direction of insertion of said key;

The plane containing the sliding direction of said front end of said pusher contains the axis of rotation of said rotor;

The pusher is a plastic molded part;

The pusher is returned elastically to said retracted rest position by elastic means of the electric switch.

BRIEF DESCRIPTION OF THE DRAWINGS

Other characteristics and advantages of the invention will appear on reading the detailed description below of a preferred embodiment with reference to the attached drawings of which.

DETAILED DESCRIPTION OF A PREFERRED EMBODIMENT

To facilitate the understanding of the description below and of the claims, terms such as "horizontal", "vertical", "upper", "lower" "front", "rear", etc. are used, notably in reference to the figures. However such use is understood to be non-limitative.

Figure 1:
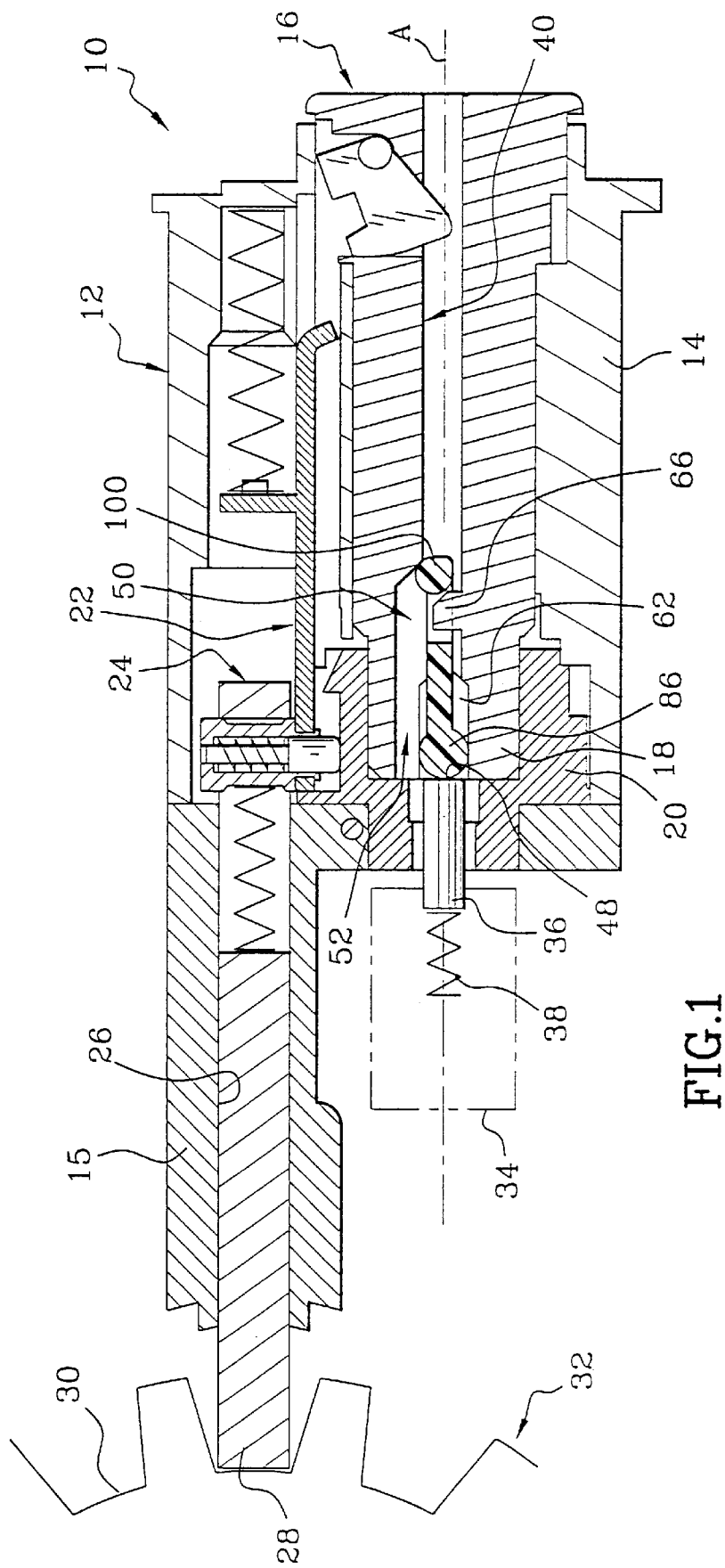
FIG. 1 is a longitudinal sectional view showing the main components of an anti-theft device according to the invention, with the pusher shown in its low retracted rest position in the absence of a legitimate key inserted in the anti-theft device.

The main components of an embodiment of a motor vehicle anti-theft device 10 are shown in FIG. 1.

The device includes a casing 12 in two parts, a rear part 14 and a front part 15.

The rear part 14 receives rotationally, around a longitudinal axis A, a rotor 16 of a lock (not shown in detail) whose cylindrical front end section 18 drives rotationally a projecting part 20 forming a cam that controls the longitudinal sliding movements, in both directions along a direction parallel to the axis A, of a control bar 22 controlling the movements of a locking bolt 24.

The sliding of the bolt 24 is guided by a guide sleeve 26 formed in the front part 15 of the casing 12 such that the front end 28 of the bolt 24 projects axially beyond the part 15 and inserts into one of the axial grooves 30 of a steering column shaft 32 associated with the anti-theft device 10.

According to a known design, the anti-theft device 10 includes electric means forming a switch to control various electric equipment of the vehicle.

FIG. 1 shows in a simplistic manner by a dot-dash outline 34 the body of an electric switch with an activating push-button 36 projecting towards the rear and penetrating axially at least partially inside the projecting part 20 of the rotor 16.

Since the rotor 16 is required to rotate about its axis A, the push-button 36 is coaxial with the axis A. The switch 34 includes elastic means 38 tending to maintain the switch 34 in its normal position (open or closed) and pushing the push-button 36 towards the rear (towards the right in FIG. 1) into its so-called rest position.

Figure 3:
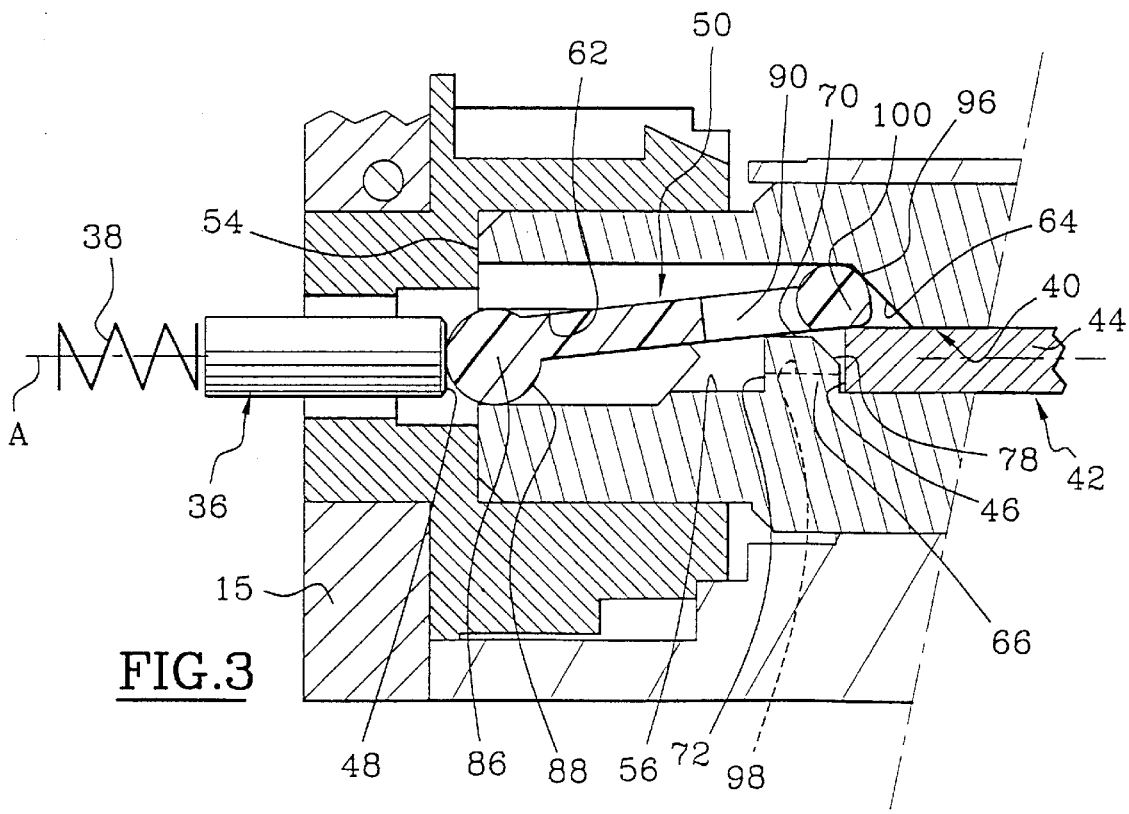
FIG. 3 is a view similar to that of FIG. 2 in which the pusher is illustrated in high advanced activating position in the presence of a legitimate key inserted in the anti-theft device.
Figure 6:
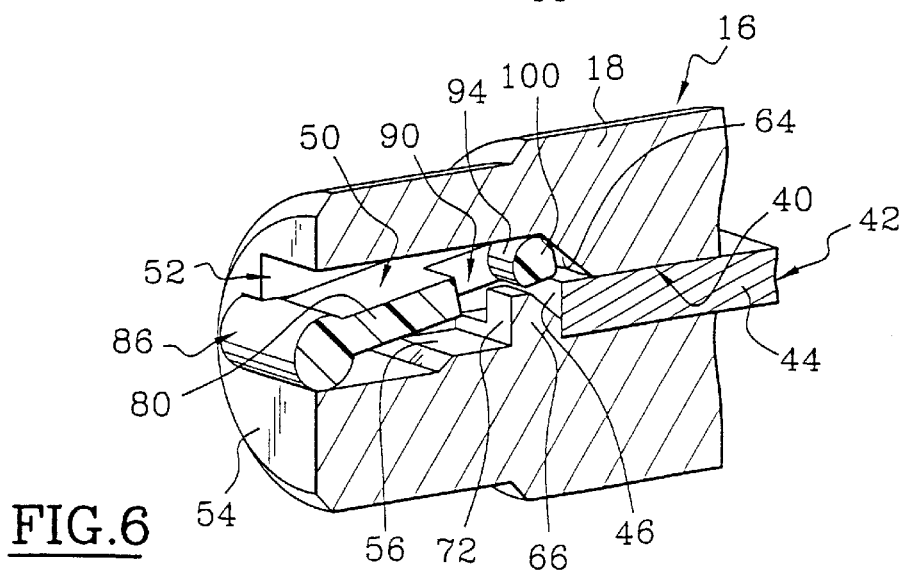
FIG. 6 is a view similar to that of FIG. 5 in which the pusher is illustrated in its high advanced activating position.

The rotor 16 includes, in a known manner, an axial passage or keyhole 40, here of rectangular transversal section, which receives the shank 42 of a key of the anti-theft device 10 of which FIGS. 3 and 6 show just the front end 44 delimited by a transversal end face 46.

According to the invention, to allow the detection of the presence of a legitimate key 42 inserted in the rotor 16, to enable the rotation of the rotor, the rear transversal end 48 of the push-button 36 of the switch 34 is pushed by a one-piece pusher 50, for example of molded plastic, fitted inside the front end section 18 of the rotor 16.

For this purpose, the front end section 18 includes a housing 52 of substantially axial orientation which has openings at the transversal face of the front end 54 of the rotor 16,18 and at the rear into the keyhole 40.

The housing 52 is globally delimited by two horizontal faces parallel to the axis A, a lower face 56 and an upper face 58 separated by a distance greater than the vertical height of the keyhole 40.

Figure 4:
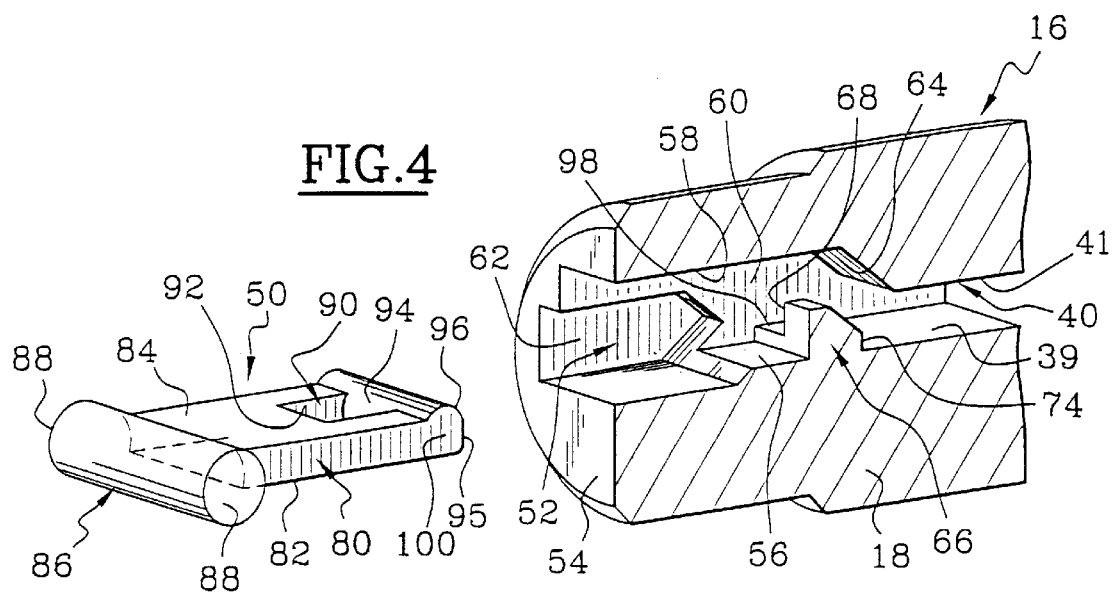
FIG. 4 is a large scale exploded perspective view, partially in section in a vertical longitudinal plane, which illustrates the pusher and the front end section of the rotor in which it is fitted according to the invention.

The housing 52 is also delimited by two parallel vertical faces 60 of the axial orientation one of which is visible in FIG. 4.

The lower horizontal face 56 is located substantially in the same horizontal plane as the lower horizontal face 39 of the keyhole 40.

Each of the paralled vertical faces 60 includes at its front end a longitudinal groove 62 of axial orientation and whose end opens on the transversal face front 54 of the rotor 16, 18 and whose height is less than the distance separating the lower and upper faces 56, 58 of the housing 52.

The upper horizontal face 58 of the housing 52 is connected with the upper horizontal face 41 of the keyhole 40 by a transversal face 64 which is inclined downwards towards the rear, here at an angle of about 45° relative to the axis A.

The housing 52 also includes a stud 66 that controls the movements of the pusher 50.

The stud extends vertically upwards from the lower horizontal face 56 of the housing 52 and it is delimited transversally by the two parallel vertical faces 60, vertically by an upper horizontal face 70, and longitudinally towards the front by a vertical transversal face 72 and towards the rear by a vertical face of smaller height 74.

The vertical transversal rear face 74 is connected with the upper horizontal face 70 by an inclined transversal face 78, the inclination here being about 45°. This inclined surface 78 lies parallel to the inclined face 64 at the rear of the upper surface 58 of the housing 52. These two parallel inclined surfaces 64 and 78 therefore delimit an inclined passage.

The pusher 50, also referred to as a "feeler", is for example a molded plastic part whose main body is a rectangular horizontal plate 80 which, when fitted inside the housing 52 (FIGS. 2 and 3), lies substantially parallel to the axis A.

Figure 2:
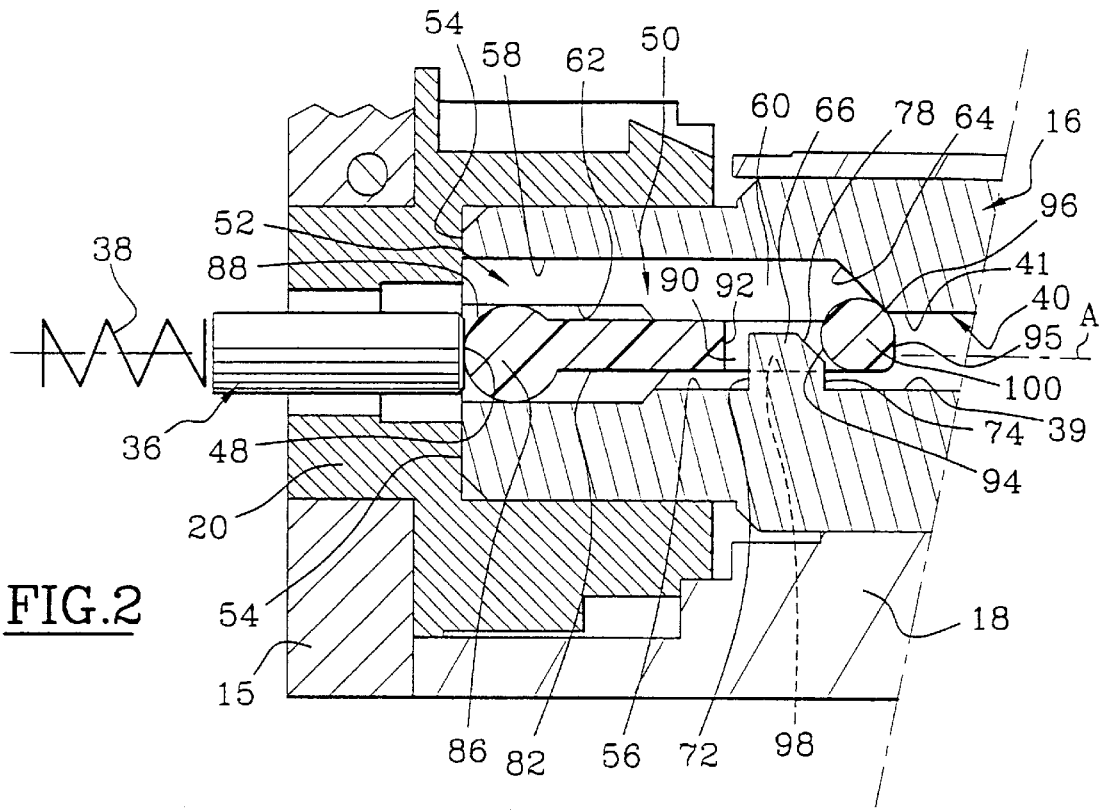
FIG. 2 is a view at larger scale of part of FIG. 1 illustrating design details of the pusher and the rotor body of the anti-theft device's lock.
Figure 5:
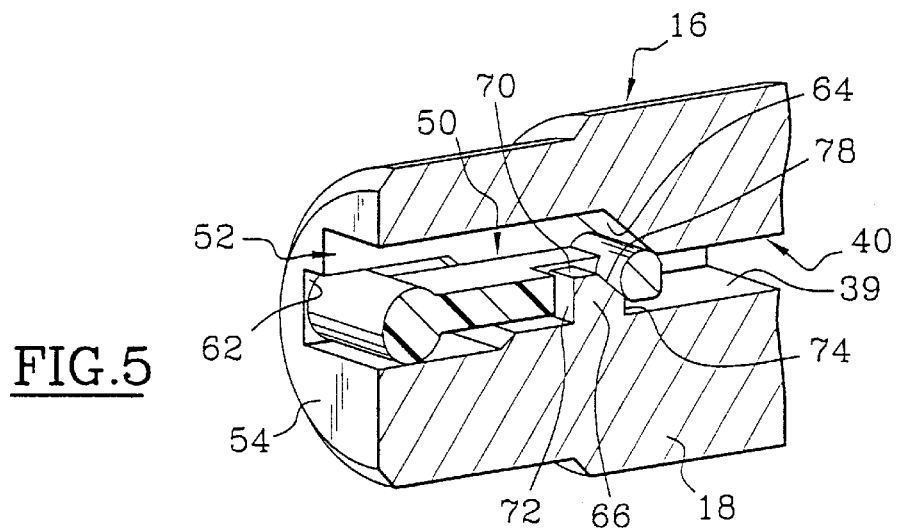
FIG. 5 is a view similar to that of FIG. 6 in which the pusher is illustrated in its low retracted rest position.

The plate 80 is delimited by a lower face 82 and an upper face 84 which are parallel to the axis A when the pusher is in its rest position, as illustrated in FIGS. 2 and 5.

The front end 86 of the pusher 50 is a cylindrical bar lying perpendicular to the axis A whose length in the transversal direction exceeds the width of the plate 80 such that its two ends 88 form cylindrical tenons that fit into and can move longitudinal and rotationally in the grooves 62.

The front end in the form of a cylindrical transversal bar 86 is thereby guided by the grooves 62 in the housing 52 when it slides longitudinal forwards or rearwards.

The rear part of the plate 80 has an aperture 90 of longitudinal orientation which penetrates the plate 80 vertically and which accommodates the stud 66 with a degree of longitudinal play, as seen notably in FIGS. 2 and 3.

The aperture 90 is delimited longitudinally to the front by a vertical transversal face 92 and to the rear by a convex cylindrical transversal face 94 which is intended to cooperate with the inclined rear face 78 of the stud 66 forming an ascending ramp.

The rear of the plate 80 is delimited transversally by a vertical transversal face 95 which joins at the top a convex cylindrical surface 96 intended to cooperate with the inclined transversal face 64 forming a ramp on the upper surface of the housing 52.

In the assembled rest position illustrated in FIGS. 2 and 5, the pusher 50 rests in its horizontal position parallel to the axis A on two transversal steps 98, one on each side of the stud 66, which support vertically the sections on opposite sites of the aperture 90 of the lower horizontal face 82 of the pusher 50.

Under the action of the elastic means 38 and the switch push-button 36, the pusher 50 is pushed elastically rearwards towards its low retracted rest position, illustrated in FIGS. 2 and 5, in which the rounded surface 96 of the rear end 100 of the plate 80 of the pusher 50 bears axially against the bottom of the inclined transversal face 64 with this rear end 100 extending partially into the keyhole 40.

In this same rest position, the rounded face 94 at the rear end of the aperture 90 rests in proximity to transversal face 78, though not in contact with, the inclined transversal face 78 of the stud 66 forming an ascending ramp.

When a key 42 is inserted in the keyhole 40, axially from the rear towards the front, its transversal front end face 46 makes contact with the transversal face of the rear end 95 of the pusher 50 and pushes the pusher 50 axially forwards from its low retracted rest position illustrated in FIGS. 2 and 5.

During this axial sliding movement forwards, the rounded rear face 94 of the aperture 90 comes into contact with the ramp 78 of the stud 66, which causes the rear end 100 of the pusher 50 to move upwards, whereas its front end 86, 88 continues to be guided horizontally forwards by the grooves 62, the plate 80 rotating slightly around its transversal axis defined by the tenons 88 as the rear end 100 rises.

As the pusher 50 slides forward its acts on the push-button 36, causing a change of state of the switch 34, until the shank of the key is completely inserted in the keyhole 40, at which point for example its front end 46 makes contact with the rear vertical transversal face 74 of the stud 66 or remains at some axial distance from this face 74.

When the key is removed, axially towards the rear, the pusher 50 is to pushed axially rearwards from the position illustrated in FIGS. 3 and 6 under the action of the elastic means 38 and via the push-button 36.

During this axial sliding movement, the rounded face 96 of the rear part of the pusher 50 cooperates with the inclined transversal face 64 forming a ramp causing the rear end 100 to move downwards until the pusher 50 finds itself again in its retracted rest position illustrated in FIGS. 2 and 5 in which the rounded part 96 is in axial contact with the inclined transversal face 64 and in which the lower face 82 of the plate 50 bears vertically on the steps 98.

The shapes of the rear end 100 of the pusher 50 and the complementary shapes of the rotor 16, 18 and the housing 52 are such that, when the key 42 is fully inserted, the pusher 50 does not exert any inconvenient axial force on the key 42, which would tend to push the key out of the keyhole towards the rear. The only force exerted on the front end 44 of the key shank is substantially vertical, tending to press this end downwards against the lower horizontal face 39 of the keyhole 40.

The preceding description of a preferred embodiment is non-limitative. It will be clear to professionals of the art that variants are possible, while remaining within the framework of the invention, notably as regards the shapes of the surfaces of the pusher 50 and the housing 52 controlling the movements of the pusher 50.

What is claimed is:

1. An anti-theft device for a motor vehicle, comprising, an electric switch for the detection of insertion of a key in the anti-theft device, a pusher in communication with said electric switch, said pusher being able to slide in both directions parallel to an axis of insertion of said key; said pusher activating said switch under the action of said key acting against an elastic force which tends to move said pusher back against a stop in a retracted rest position when said key is withdrawn, wherein said pusher is free to slide longitudinally in a housing of a body, said housing including means of sliding guidance of the front end of said pusher, and wherein the rear end of said pusher, on which said key acts when it is inserted, cooperates with a ramp on said body to cause a movement of this rear end, in an inclined direction relative to the sliding direction, between a low retracted position corresponding to the rest position of said pusher, and a high advanced activating position, and wherein said pusher defines a longitudinal aperture through which extends vertically a stud of said housing of said body.

2. A device according to claim 1, wherein said front end of said pusher comprises a transversal switch activating bar having ends that are guided in grooves formed in said body and running parallel to the sliding direction of said pusher.

3. A device according to claim 2, wherein said front transversal bar of said pusher is cylindrical.

4. A device according to claim 1, wherein said pusher includes a body in the form of a plate, substantially parallel to the direction of insertion of said key, and said housing includes a face that cooperates with a rear transversal edge of said aperture to constitute said ramp that causes movement of said rear end of said pusher from said low retracted rest position into said high advanced activating position.

5. A device according to claim 4, wherein said rear transversal face is inclined upwards from rear to front to constitute an ascending ramp for the pusher towards said high advanced activating position, and wherein the rear transversal edge of said aperture of the pusher is rounded to cooperate with said ascending ramp.

6. A device according to claim 5, further comprising, a transversal rear edge of said plate of said pusher, wherein said transversal rear edge cooperates with said body to cause movement of said rear end of said pusher from said high advanced activating position into said low retracted rest position.

7. A device according to claim 6, wherein said transversal rear edge of said plate of said pusher is rounded to cooperate with a transversal face of said body which is inclined downwards from front to rear to constitute a descending ramp, parallel to said ascending ramp, guiding said pusher towards said low retracted rest position.

8. A device according to claim 1, wherein said retracted rest position of said pusher is determined by the arrival of said rear end against a stop formed by part of a transversal face of said body.

9. A device according to claim 1, wherein said body is a rotor body mounted rotationally on an axis parallel to the direction of insertion of said key.

10. A device according to claim 6, wherein the plane containing the sliding direction of said front end of said pusher contains the axis of rotation or said rotor.

11. A device according to claim 1, wherein said pusher is of molded plastic.

12. A device according to claim 1, wherein said pusher is returned elastically to said retracted rest position by means for returning of said electric switch.

* * * * *